United States Patent [19]

MacDonald et al.

[11] 4,107,345
[45] Aug. 15, 1978

[54] PARTICULATE DEHYDRATED POTATOES WITH MONO- AND ETHOXYLATED GLYCERIDES

[75] Inventors: Ira A. MacDonald, Prior Lake, Minn.; Richard R. Egan, Worthington, Ohio

[73] Assignee: Ashland Oil, Inc., Ashland, Ky.

[21] Appl. No.: 156,120

[22] Filed: Jun. 23, 1971

[51] Int. Cl.$^2$ ............................................. A23L 1/12
[52] U.S. Cl. .................................... 426/637; 426/473; 426/661
[58] Field of Search ............... 99/100, 207, 90, 91; 252/351, 356; 426/342, 320, 372, 321, 443, 465, 466, 473, 24, 28, 673, 661

[56] References Cited

U.S. PATENT DOCUMENTS

| | | | |
|---|---|---|---|
| 2,967,109 | 1/1961 | Morgan | 99/207 |
| 2,981,629 | 4/1961 | Ginnette | 99/207 |
| 3,031,312 | 4/1962 | Morgan | 99/207 |
| 3,031,313 | 4/1962 | Morgan | 99/207 |
| 3,054,683 | 9/1962 | Hendel | 99/207 |
| 3,163,546 | 12/1964 | Pader | 99/207 |
| 3,343,970 | 9/1967 | Pader | 99/207 |
| 3,394,010 | 7/1968 | Miller | 99/100 P |
| 3,433,645 | 3/1969 | Egan | 426/24 |
| 3,447,934 | 6/1969 | Weiner | 99/100 P |
| 3,535,128 | 10/1970 | Willard | 99/207 |
| 3,679,430 | 7/1972 | Bernbaum | 99/91 |

*Primary Examiner*—Norman Yudkoff

[57] ABSTRACT

Improved particulate dehydrated potatoes are prepared by a process in which both a food additive amount of ethoxylated monoglyceride and a food additive amount of an edible monoglyceride (e.g. GMS) are incorporated into the potatoes prior to dehydration.

12 Claims, No Drawings

PARTICULATE DEHYDRATED POTATOES WITH MONO- AND ETHOXYLATED GLYCERIDES

BACKGROUND OF THE INVENTION

Particulate dehydrated potatoes (e.g. granules or flakes) are prepared in large commercial quantities by processes in which potatoes are peeled, cooked, finely divided, and then dried. If granules are desired, finely divided wet mashed potatoes and recycled dried or partially dried potato particles (which serve as nuclei for the granules) are introduced into a stream of heated air which serves to at least partially dehydrate the individual potato particles and to transport the individual particles to a final drying zone (e.g. a heated moving conveyor belt). If potato flakes are desired, a slurry of mashed potatoes is drum dried. Other physical forms of particulate dehydrated potatoes can be prepared by other known techniques (e.g. extruding and drying mashed potatoes).

Processes of preparing dehydrated potatoes are described in U.S. Pat. Nos. 2,759,832; 2,780,552; and 2,787,553.

U.S. Pat. Nos. 2,980,543 and 3,163,546 disclose the preparation of dehydrated potatoes wherein food additives are employed to improve the quality of potatoes after reconstitution of the dehydrated potatoes with milk or water.

At the present time, distilled monoglycerides (i.e. partially refined fat monoglycerides containing at least 90% monoglycerides) are in widespread use as intentional food additives in the preparation of dehydrated potatoes. Although numerous additives have been tested for use as replacements for highly distilled monoglycerides, their performance as measured in terms of product quality have not demonstrated significant advantages over distilled monoglycerides when compared on a cost/performance basis. Even lower purity monoglycerides (e.g. 60% monoglycerides) are not effective substitutes for the highly distilled monoglycerides (i.e. 90% monoglycerides).

SUMMARY OF THE INVENTION

It has now been discovered that the use as intentional food additives of both ethoxylated monoglycerides and edible monoglycerides in the manufacture of particulate dehydrated potatoes offers certain advantages among which are the following:

(a) The additive mixture is easier to disperse in water than distilled monoglycerides, alone;

(b) The use of an ethoxylated monoglyceride permits the use of edible monoglycerides which are not commercially acceptable when used alone (e.g. 50–60% monoglycerides);

(c) Upon reconstitution with water, the improved particulate dehydrated potatoes of the present invention can be mixed with more water than heretofore thought possible (approaching or exceeding the quantity of water present in mashed fresh potatoes) without sacrificing appearance or eating qualities (e.g. taste, texture, etc.);

(d) The color of the reconstituted potatoes is improved when greater amounts of water are used during reconstitution.

DETAILED DESCRIPTION

Ethoxylated Monoglycerides

The ethoxylated monoglycerides are prepared by the condensation of ethylene oxide with a fat monoglyceride, usually from 5–50 moles of ethylene oxide, preferably 10–30 moles of ethylene oxide (e.g. 20 moles of ethylene oxide) per mole of crude or partially refined monoglyceride containing at least 10% alpha monoglyceride and more preferably 20–40% alpha monoglyceride (e.g. 25% alpha monoglyceride). For purposes of making such calculations, it is convenient to assume that the crude or partially refined monoglyceride has an average molecular weight of 535. The condensation products typically range in appearance from pale yellow liquids to white pasty semi-solids. This is in sharp contrast to the distilled monoglycerides (e.g. 90% monoglycerides) of commerce which are hard solids at room temperature.

Since the crude or partially refined monoglycerides used in the practice of the present invention are mixtures of alpha and beta monoglycerides with diglycerides, triglycerides and/or free glycerine, calculation of the number of moles of ethylene oxide which have been condensed per mole of crude monoglyceride is not always a satisfactory method of characterizing the food additives of the present invention. More meaningful information is obtained if one records or notes both: (1) the % alpha or % total monoglyceride present in the crude or partially refined monoglyceride; and (2) the % by weight of ethylene oxide (on an anhydrous basis) present in the ethoxylated monoglyceride (i.e. based on the total weight of the complex condensate). Typically, the condensates will contain from 10–95% by weight of ethylene oxide based on 100 parts by weight of the complex ethoxylated monoglyceride. More commonly, the food additives of the present invention will contain from 25–80 weight % (e.g 45–75 weight %) of ethylene oxide on the same basis.

The acid portions of the crude monoglycerides will correspond to the fatty acid radicals common to the animal or vegetable source of the crude or partially refined monoglyceride. Typically, these fatty acid radicals will each contain from 10–24 (e.g. 14–18) carbon atoms. For many applications it is preferred that these fatty radicals be saturated. The high degree of saturation will ordinarily be reflected by an iodine value for the non-ethoxylated crude or refined monoglyceride of less than 10 and preferably less than 5 (e.g. less than 2).

The preparation of ethoxylated monoglycerides for use in the practice of the present invention begins with the preparation of an edible monoglyceride. This monoglyceride will typically contain mono, di-, and triglycerides and can be used as is (i.e. crude) or can be refined (e.g. as by distilling) to increase the monoglyceride content. Desirably, the crude or partially refined monoglyceride will contain 20–30% alpha monoglycerides. Crude monoglycerides can be prepared by the direct esterification of glycerine with fatty acids or by the glycerolysis of fully hydrogenated edible fats (e.g having the low iodine values as previously indicated for the crude and refined monoglycerides). Both of these reactions are well known in the art and crude and refined monoglycerides of varying alpha monoglyceride contents are staple articles of commerce at the present time. Crude monoglycerides (e.g. 20–30% alpha monoglyceride) are preferred over the highly refined monoglycerides (e.g. 90% monoglycerides). In this connection it has been found that when crude or partially refined monoglycerides containing above about 60% alpha monoglycerides or above about 70% total monoglycerides are used (the two figures are comparable), extra processing is required and the preparation of these food additives becomes uneconomical. Furthermore, there do not appear to be any performance advantages (in food) associated with the use of high purity (e.g substantially 100% pure) monoglycerides as a raw material in the preparation of the ethoxylated food additives.

The reaction between the crude or refined monoglycerides and ethylene oxide can be conducted under condensation conditions of the type heretofore used to prepare the condensation products of ethylene oxide with, for example, sorbitan monostearate. Thus, ethylene oxide and a crude or partially refined monoglyceride can be condensed by heating them together in the presence of a suitable condensation catalyst (e.g. potassium hydroxide) at temperatures of from 320°–350° F. at pressures of 20–150 psig.

Edible Monoglycerides

Edible monoglycerides are well known articles of commerce and they are frequently used as intentional food additives. These monoglycerides are usually prepared in the manner and with the characteristics (e.g. fatty chain length, degree of saturation, etc.) as previously described with reference to the preparation of ethoxylated monoglycerides. However, crude edible monoglycerides intended for use as intentional food additives (e.g. in dehydrated potatoes) are generally refined prior to use by distillation to produce high purity monoglycerides (e.g. 90% monoglycerides). The effect of edible monoglycerides in foods tends to vary with the degree of purity of the monoglyceride of commerce. For example, 90% monoglycerides are used in dehydrated potatoes while 60% monoglycerides are generally considered unsuitable for use in commercial dehydrated potatoe operations. The most common monoglyceride is glycerol monostearate, which is commonly referred to as "GMS".

Preparation of Particulate Dehydrated Potatoes

The present invention can be practiced by incoporating a mixture of ethoxylated monoglyceride and edible monoglyceride in the potatoes at levels of from 0.1–1% based upon the weight of the dehydrated product. More usually, the amount of the additive mixture will be from 0.2–0.8% on the same basis (e.g. 0.3–0.7%).

Although mixtures can be made of the ethoxylated monoglyceride and edible monoglyceride in all proporations, all such mixtures do not serve with equal effectiveness. Based upon current commercial considerations, the mixture of food additives will normally comprise one or more edible monoglycerides and one or more ethoxylated monoglycerides in a weight ratio of edible monoglyceride to ethoxylated monoglyceride of from 0.5–10:1, more usually from 1–6:1 (e.g. about 1.5–4:1). Desirably, the ethoxylated monoglyceride and edible monoglyceride will first be formed into an aqueous dispersion and this aqueous dispersion mixed with cooked mashed potatoes prior to dehydration.

The use of ethoxylated monoglycerides in combination with edible monoglycerides/water systems is particularly advantageous for the following reasons. The distilled monoglycerides which are most useful in dehydrated potatoes must normally be dispersed in water to readily be incorporated into the mash prior to its dehydration. Usually this aqueous mixture contains about 15 weight % edible monoglyceride, plus other food additives. Mixtures of edible monoglycerides and water undergo phase changes as they are heated. In this concentration range (up to about 40% GMS) nothing happens until the melting point of the monoglyceride is reached. The melting point of commercial distilled monoglycerides is about 60°–62° C. At about this temperature, a disperse phase occurs. This disperse phase persists until a temperature of about 67°–70° C. is reached where a viscous isotropic or solid gel phase is formed. Consequently, the mixture of water and monoglyceride must be maintained in this narrow temperature range for the monoglyceride/water system to remain in the dispersion phase so that it is fluid enough to be pumped and dispersed uniformly in a potato mash.

Other commonly used food additives such as sodium bisulphite, sodium acid pyrophosphate and citric acid are electrolytes which strongly influence the phase transition of the monoglyceride/water system. The electrolytes raise the transition temperature from crystals plus water to the dispersion phase and, at sufficiently high concentration of the electrolytes, no dispersion phase occurs and the viscous isotrope is obtained directly from crystals plus water. This limits the concentration of other food additives that may be included in the monoglyceride/water system and further narrows the temperature range of the useful dispersion phase.

The concentration of the edible monoglyceride also affects the phase transformation. The figures given above are for commercial monoglycerides with at least a 90% monoglyceride content. Mono- and diglycerides of significantly less than about 90% monoglyceride content do not form the dispersion phase. Thus mono- and diglycerides of commerce with about 60% monoglycerides content cannot be used as intentional food additives in dehydrated potatoes because they cannot be dispersed in water for incorporation into the potato mash.

However, it has been found that the addition of an ethoxylated monoglyceride (EMG) alters the phase behavior so that a dispersion of monoglycerides or commercial mono- and diglycerides is obtained at lower temperatures and the disperse phase persists to temperatures above that of the GMS alone (as shown in the following table), thus broadening the temperature range at which the monoglyceride/water system is useful.

TABLE I

| Monoglyceride/water system | Dispersion formed | Temperatures (° C) at which viscous isotrope forms |
|---|---|---|
| 15% GMS (63% mono) | No | 59° |
| 15% GMS (93% mono) | Yes | 67° |
| 15% EMG/GMS (63%) | Yes | dispersion phase to 90° + |
| 7.5% EMG/GMS (93%) | Yes | 88.1° |

In Table I, "GMS" means glycerol monstearate of commerce; the percentage figures after "GMS" indicate the total monoglyceride content; all mixtures of ethoxylated monoglyceride (EMG) were 3 parts by weight edible monoglyceride per 1 part by weight EMG; and the EMG was a commercially available product (Starfol D, a product of Ashland Chemical Company).

The present invention is further illustrated by the following specific examples. Unless otherwise indicated, all parts and percentages are by weight.

EXAMPLE 1

This example illustrates the preparation of a crude monoglyceride by the glycerolysis (Step I) of a fatty triglyceride and the subsequent condensation (Step II) of ethylene oxide with the crude monoglyceride of Step I to form an ethoxylated monoglyceride useful in the practice of the present invention.

Step I (Preparation of a Crude Monoglyceride)

Ninety parts of a fatty triglyceride (hydrogenated tallow) having an iodine value of less than 5 are placed in a reaction vessel and melted. Meanwhile, 0.3 parts of potassium hydroxide (100% basis) are dissolved in 10 parts of glycerine. The resulting glycerine/KOH mixture is then poured into the reaction vessel and mixed with the melted triglyceride. The resulting reaction mixture is then heated with agitation to a reaction temperature of 320°–340° F. Agitation is continued and the reaction mixture is sparged with nitrogen. After the reaction is complete (e.g. after 8–10 hours) the contents of the reaction vessel are cooled and recovered. The recovered product is a crude monoglyceride containing approximately 25% alpha monoglycerides, 2.5% unreacted glycerine, with the balance being beta monoglycerides, diglycerides and triglycerides. This crude monoglyceride (a mixture) will typically have an acid number less than 1, a saponification number of approximately 170–175, an average molecular weight of 520–550 (e.g. 535), and be a clear, pale liquid at 140° F.

A hydrogenated fatty triglyceride which can be used in the foregoing reaction is an edible grade of hydrogenated tallow having an iodine value of less than 2, an acid value of less than 2, a saponification value of 190–200, a titer of 55°–62° C., and an average molecular weight of 850–875. The fatty acid radicals present in such a hydrogenated tallow are typically 4% myristic acid (a $C_{14}$ acid), 31% palmitic acid (a $C_{16}$ acid) and 65% stearic acid (a $C_{18}$ acid).

Step II (Preparation of an Ethoxylated Monoglyceride)

Five hundred thirty-five parts (i.e. one mole) of the crude monoglyceride of Step I are added to a reaction vessel which is closed, heated to 320°–340° F. and held at that temperature. The monoglyceride is then agitated and the reaction vessel is thoroughly swept with dry nitrogen to remove all traces of water and oxygen. This step is repeated. The reaction vessel is then closed and nitrogen pressure is allowed to built up to 5 psig. Next, the addition of 880 parts (i.e. 20 moles) of ethylene oxide is begun. The reaction between the ethylene oxide and crude monoglyceride begins instantly. It is catalyzed by the potassium hydroxide from Step I which was not removed from the crude monoglyceride. The pressure in the reaction vessel is allowed to rise to 40–60 psig and is maintained at this level throughout the remainder of the reaction. The pressure is controlled by manipulating the addition rate of ethylene oxide. The temperature range is controlled at 340°–380° F. by a cooling coil which is used intermittently, as needed. When all of the ethylene oxide is added and reacted, the pressure will drop rapidly. Total reaction time for ethoxylation can be 8–10 hours. The reaction mixture is then cooled until the pressure in the reaction vessel has been reduced to 5 psig. The reaction vessel is then vented to the atmosphere and opened. The residual potassium hydroxide is neutralized with 3.3 parts of 85% aqueous phosphoric acid. 2.3 parts of activated charcoal are then added to the reaction mixture with agitation. The reaction product is then filtered to remove the activated charcoal. The filtrate is an ethoxylated monoglyceride (a 20 mole adduct) and will contain from 60–65% ethylene oxide (in condensed form) as reported on an anhydrous basis. Ordinarily, the hydroxyl value will be between 65–80 and the saponification value will be 65–75. Usually, the acid value will be less than 2.

The standard test methods found in *Food Chemicals Codex* First Edition, 1966, can be used for determining, for example, acid value.

EXAMPLES 2 AND 3

Potatoes were peeled chemically with caustic followed by washing. Next, the potatoes were sliced into approximately 1 cm. slices. The sliced potatoes were then blanched in hot water to prevent discoloration and were thereafter washed with water. The blanched potatoes were then cooked on screen trays for 30 minutes with live steam at atmospheric pressure. The cooked potatoes were then mashed through a ricer and an additive solution was mixed with the mashed cooked potatoes using three parts of additive solution per 1000 parts of mashed cooked potatoes. Mixing was accomplished on a Hobart mixer with paddle for approximately 1 minute. The resulting mixture was then dehydrated on a drum drier. The resulting thin sheets of dried or dehydrated potatoes were then broken into small flakes.

The composition of the additive solution was as follows:

| Additive Solution | | |
|---|---|---|
| Monoglyceride additive | 157.3 | parts |
| Citric acid | 3.2 | " |
| Sodium acid pyrophosphate | 31.2 | " |
| Sodium bisulfite | 28.7 | " |
| Antioxidant (Sustane P) | 8.0 | " |
| Water | 771.6 | " |
| | 1000.0 | |

In Example 2, the monoglyceride additive was a mixture of one part of ethoxylated monoglyceride with three parts of a highly distilled edible monoglyceride (GMS 900, a product of Ashland Chemical Company). In Example 3, the monoglyceride additive was a mixture of ethoxylated monoglyceride and edible monoglyceride in a weight ratio of three parts of edible monoglyceride per one part of ethoxylated monoglyceride. The edible monoglyceride was a 60% monoglyceride (GMS 600, a product of Ashland Chemical Company). In both Examples 2 and 3, the ethoxylated monoglyceride was substantially identical to that of Example 1.

In both Examples 2 and 3, the monoglyceride additive mixture was easier to disperse in water than a similar amount of edible monoglyceride, only.

For purposes of comparison, a control sample was made using a commercially available distilled monoglyceride (Myverol 1806, a 90% monoglyceride) as the monoglyceride additive.

The texture of the resulting flakes was evaluated through the use of a standardized test. In this test, 440 grams of water (168°–170° F.) are added to 95 grams of dried flakes in the bowl of a kitchen mixer and mixed with a blade paddle for 20 seconds. The technician performing the test is trained to evaluate the reconstituted potatoes as passable Grades "A", "B", or "C", or as "not passable". Grade "A" is the best and represents the driest reconstituted potatoes. In this test, a small ball of the reconstituted potatoes is broken apart and checked for a clean break, firmness, dryness, pastiness, etc. The control, which represents the current commercial standard, tested "A". Similarly, reconstituted potatoes of Example 2 and 3 tested "A".

A commercial formula for reconstituting flakes involves mixing 1¾ cups of particulate dehydrated potato flakes, 1½ cups of boiling water, ½ cup of cold milk and 1 teaspoon of salt.

EXAMPLE 4

In this example, wet color and texture of reconstituted dehydrated potato flakes were measured. Also, water imbibition factors were measured.

The monoglyceride additive of Example 4 was 0.5% by weight (dry potato basis) of a mixture consisting of 75% weight % distilled monoglyceride (GMS-900, a product of Ashland Chemical Company) and 25 weight % of ethoxylated monoglyceride (Starfol D, a product of Ashland Chemical Company).

For purposes of comparison, the tests were repeated by using 0.5% by weight of a highly distilled edible monoglyceride (Myverol 18-06, a product of Distillation Products Industries) and by using 0.5% by weight of ethoxylated monoglyceride (Starfol D).

Milk colors were checked (Agtron) at a 5.3/1 liquid/solid ratio using a mixture of milk and water as recommended for mashed potatoes. The results were as follows in declining order:
1. (Best color) Example 4. The color was very satisfactory and improved when higher liquid/solid ratios were used (milk level held constant).
2. (Good color) distilled edible monoglyceride, alone. Color was almost as good as Example 4.
3. (Worst) ethoxylated monoglyceride, alone. Much poorer color and barely over commercial specification of 40 minimum.

These results (i.e. the same color order) were confirmed by measuring color with a Gardner Automatic Color Difference Meter.

Textures showed some improvement in using more liquid over the range of 5.7 to 6.5 parts of liquid per part of flakes. The textures were rated in the following order:
1. (Best) Example 4
2. edible monoglyceride
3. (Worst) ethoxylated monoglyceride Water imbibition tests reflect how potato flakes swell in water. The test is intended to give an indication as to the number of servings of mashed potatoes that can be obtained in the institutional trade where mashed potatoes are dispersed by volume (e.g. from an ice cream dipper). Based on average inbibition factors (3 tests), the following results were obtained:
1. (Most water) Example 4
2. ethoxylated monoglyceride
3. edible monoglyceride

What is claimed is:

1. In the process of preparing particulate dehydrated potatoes wherein potatoes are cooked and dried, the improvement which comprises incorporating first and second intentional food additives into said potatoes before drying, said first additive consisting essentially of the condensation product of from 10 to 95 parts by weight ethylene oxide with correspondingly from 90 to 5 parts by weight of mixed $C_{10}$-$C_{24}$ fatty acid ester of glycerine, said mixed ester having at least a 10 weight percent monoglyceride content with diglycerides, triglycerides and glycerine constituting the balance of said mixed ester and said second additive being an edible monoglyceride.

2. The process of claim 1 wherein:
(a) said first intentional food additive contains from 45–75 parts of ethylene oxide, the fatty acid radicals are $C_{14}$-$C_{18}$ fatty acid radicals, and the mixed ester contains 20–30% alpha monoglycerides, and
(b) the weight ratio of the second additive to the first being about 1.5–4:1.

3. The process of claim 2 wherein the total amount of said first and second intentional food additives is from 0.3–0.7% based on the weight of the dehydrated potatoes.

4. The process of claim 3 wherein said potatoes are mashed before drying, and wherein said first and second intentional food additives are mixed with water which is thereafter mixed with said mashed potatoes prior to said drying.

5. Particulate dehydrated potatoes which have incorporated therein first and second intentional food additives, said first additive consisting essentially of the condensation product of from 10 to 95 parts by weight ethylene oxide with correspondingly from 90 to 5 parts by weight of mixed $C_{10}$-$C_{24}$ fatty acid ester of glycerine, said mixed ester having at least a 10 weight percent monoglyceride content with diglycerides, triglycerides and glycerine constituting the balance of said mixed ester and said second additive being an edible monoglyceride.

6. Products of claim 5 wherein:
(a) said first intentional food additive contains from 45–75 parts of ethylene oxide, the fatty acid radicals are $C_{14}$-$C_{18}$ fatty acid radicals, and the mixed ester contains 20–30% alpha monoglycerides, and
(b) the weight ratio of the second additive to the first is from 1.5–4:1.

7. Products of claim 6 wherein the total amount of said first and second intentional food additives is from 0.3%–0.7% based on the weight of the dehydrated potatoes.

8. Products of claim 7 wherein said second additive contains about 50–60% monoglycerides.

9. The process of forming an aqueous food additive mixture which comprises the steps of:
(a) adding first and second intentional food additives to water, said first additive consisting essentially of the condensation product of from 10 to 95 parts by weight ethylene oxide with correspondingly from 90 to 5 parts by weight of mixed $C_{10}$-$C_{24}$ fatty acid ester of glycerine, said mixed ester having at least a 10 weight percent monoglyceride content with diglycerides, triglycerides and glycerine constituting the balance of said mixed ester and said second additive being an edible monoglyceride; and
(b) heating the food additive/water mixture of Step "a" sufficiently to form a disperse phase.

10. The process of claim 9 in which:
(a) said first intentional food additive contains from 45–75 parts of ethylene oxide, the fatty acid radicals are $C_{14}$-$C_{18}$ fatty acid radicals, and the mixed ester contains 20–30% alpha monoglycerides, and
(b) the weight ratio of the second additive to the first being about 1.5–4:1.

11. The process of claim 10 wherein the edible monoglyceride contains about 50–60% monoglycerides.

12. The process of claim 10 wherein said edible monoglyceride contains about 90% monoglycerides and wherein said weight ratio is about 3:1.

* * * * *